United States Patent
Fink et al.

(10) Patent No.: US 9,501,334 B2
(45) Date of Patent: Nov. 22, 2016

(54) PROTOCOL FOR COMMUNICATION OF DATA STRUCTURES

(75) Inventors: Stephen J. Fink, Yorktown Heights, NY (US); Alan A. Donovan, New York, NY (US); Darrell Reimer, Tarrytown, NY (US); Mark N. Wegman, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1199 days.

(21) Appl. No.: 12/147,602

(22) Filed: Jun. 27, 2008

(65) Prior Publication Data

US 2008/0271055 A1    Oct. 30, 2008

Related U.S. Application Data

(63) Continuation of application No. 11/327,634, filed on Jan. 6, 2006, now abandoned.

(51) Int. Cl.
*G06F 9/54* (2006.01)
*G06Q 30/06* (2012.01)

(52) U.S. Cl.
CPC ............. *G06F 9/54* (2013.01); *G06Q 30/0601* (2013.01); *G06Q 30/0641* (2013.01)

(58) Field of Classification Search
CPC . G06F 9/54; G06Q 30/0601; G06Q 30/0641
See application file for complete search history.

(56) References Cited

U.S. PATENT DOCUMENTS

| | | | |
|---|---|---|---|
| 6,842,786 B1 | 1/2005 | Webb | |
| 6,901,430 B1 * | 5/2005 | Smith | 709/206 |
| 7,188,158 B1 * | 3/2007 | Stanton et al. | 709/220 |
| 7,296,022 B2 | 11/2007 | Harjanto | |
| 7,627,503 B1 * | 12/2009 | Champagne et al. | 705/27 |
| 2002/0049663 A1 * | 4/2002 | Kahana | 705/37 |
| 2003/0004823 A1 * | 1/2003 | Sagy | G06Q 10/087 705/26.1 |
| 2003/0065584 A1 * | 4/2003 | Takaoka | G06Q 30/06 705/26.1 |
| 2004/0078424 A1 | 4/2004 | Yairi et al. | |
| 2005/0050473 A1 * | 3/2005 | Lamb et al. | 715/744 |
| 2006/0047780 A1 * | 3/2006 | Patnude | 709/219 |
| 2006/0085208 A1 * | 4/2006 | Nelson et al. | 705/1 |

* cited by examiner

*Primary Examiner* — Charles E Anya
(74) *Attorney, Agent, or Firm* — Fleit Gibbons Gutman Bongini Bianco PL; Thomas S. Grzesik

(57) ABSTRACT

A system and method are provided for communicating information in a data structure between applications. According to the method, a description of a data structure is sent from a first application to a second application, and there is received from the second application an identification of at least one portion of the data structure that is requested by the second application. The first application marshals a subset of the data structure consisting of the at least one portion that was identified, and there is sent from the first application to the second application the marshalled subset of the data structure.

20 Claims, 6 Drawing Sheets

PROTOCOL FOR COMMUNICATION OF DATA STRUCTURES

CROSS-REFERENCE TO RELATED APPLICATIONS

This is a continuation of application Ser. No. 11/327,634, filed Jan. 6, 2006, now abandoned. The entire disclosure of prior application Ser. No. 11/327,634 (now abandoned) is herein incorporated by reference.

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

FIELD OF THE INVENTION

This invention relates generally to computer systems, and more specifically to protocols for communicating data structures between applications.

DESCRIPTION OF RELATED ART

Communicating processes in software systems require sharing of data and often communicate by exchanging messages containing the necessary data. Historically, message-passing processes spend a significant computational effort marshalling the data (i.e., gathering the relevant parts of the data from the memory of the sending program, and assembling them into a canonical serial format or wire protocol). This serialized data is then transmitted to the receiver process (for example, by writing it to a file or by streaming it over a network), which then unmarshals the message into the desired format.

Some programming languages provide facilities to automate this serialization process. Typically, a serialization library uses class meta-data, which is provided by the programming language's runtime-system. This meta-data describes the structure of the types and data structures in the system, and enables the serialization mechanism to automatically marshal and unmarshal program data structures. The whole process may be completely transparent to the user, encapsulated by a single procedure call (for example, send(x) in the sender, y:=recv( ) in the receiver). Although this automatic facility reduces programmer effort, it may introduce significant computational work if the serialized data structure is large.

As an optimization, some object-oriented programming languages allow the user to specify that object-graph edges originating at certain object fields are not to be traversed during marshalling. In object-oriented programming languages, a data structure will often be represented as a graph of objects, with each object in the data structure containing fields that hold pointers or references to other objects in the data structure. For some data structures, this optimization can significantly reduce the size of the serialized format. Reachable fields marked by the user are not considered part of the persistent state of the object, but may be used to hold derived or cached values, for example.

For example, the Java standard library contains a serialization mechanism in the classes java.util.ObjectOutputStream and java.util.ObjectInputStream. The programmer may label fields of Java classes as transient to prevent them from being serialized.

However, there are numerous limitations with this approach. One fundamental problem is that the sender process may not know which data the receiver process requires, and so the sender must conservatively send all data that might be required by the receiver. However, in many cases, if the sender had more knowledge of the receiver's requirements, it could marshal and send less data and thus enjoy better performance.

Thus, it would be highly desirable to provide a method whereby the sender could acquire information on the data required by the receiver. It would further be highly desirable to acquire this information dynamically at run-time, for cases where the receiver's data requirements cannot be determined beforehand.

SUMMARY OF THE INVENTION

One embodiment of the present invention provides a method for communicating information between applications. According to the method, a description of a data structure is sent from a first application to a second application, and there is received from the second application an identification of at least one portion of the data structure that is requested by the second application. The first application marshals a subset of the data structure consisting of the at least one portion that was identified, and the marshalled subset of the data structure is sent from the first application to the second application.

Another embodiment of the present invention provides an information processing system that includes a first interface for sending a description of a data structure from a first application to a second application, a second interface for receiving from the second application an identification of at least one portion of the data structure that is requested by the second application, and a processor. The processor is programmed to marshal a subset of the data structure consisting of the at least one portion that was identified, and send to the second application the marshalled subset of the data structure.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings.

DETAILED DESCRIPTION OF THE PREFERRED EMBODIMENTS

Figure 1:
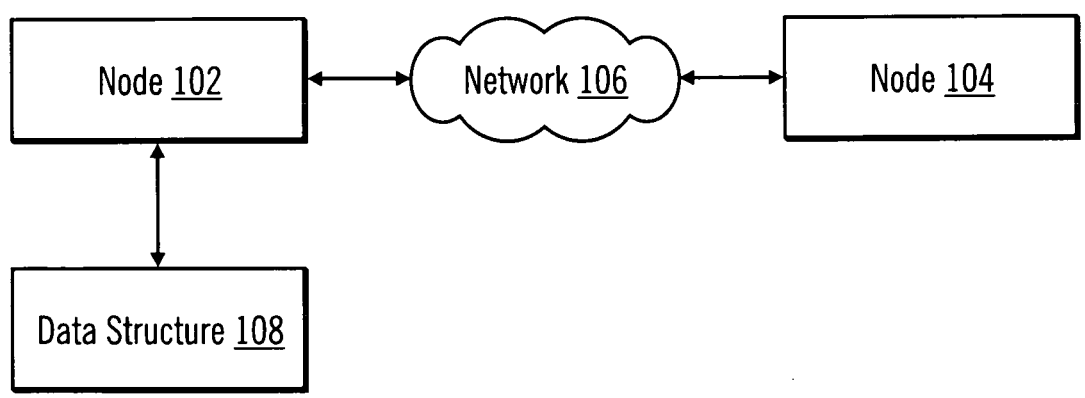
FIG. 1 is block diagram showing a high-level network architecture according to one embodiment of the present invention.

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawing like numerals refer to like parts through several views.

The present invention, according to a preferred embodiment, overcomes problems with the prior art by providing a method, computer readable medium, and information processing system for exchanging meta-data information describing data that is to be communicated for a particular message-passing operation, prior to the message passing operation. A first application, or component of the computing system, when encountering a send operation, sends a second application, or component of the computing system, some meta-data abstraction describing the data structure(s) that comprise the body of the message. The second application receives the message containing the meta-data. The second application computes a meta-data abstraction describing the portion(s) of the data structure that it requires in order to service the request and sends the computed meta-data back to the first application. The first application marshals a subset of the data structure according to the meta-data specified, and sends the message. In response, the second application receives the marshalled data, unmarshals it appropriately, and processes the message.

FIG. 1 is block diagram showing a high-level network architecture of one embodiment of the present invention. FIG. 1 shows a first node 102 and a second node 104 connected to a network 106. Nodes 102 and 104 can be applications, components of a larger application, computers running applications or any other information processing systems capable of executing applications. In this embodiment of the present invention, nodes 102 and 104 comprise any commercially available computing system that can be programmed to offer the functions of the present invention. In another embodiment of the present invention, node 104 comprises a client computer running a client application that interacts with a node 102 that is a server computer in a client-server relationship.

Nodes 102 and 104 can be implemented as hardware, software or any combination of the two. The applications or components of applications can be located in a distributed fashion in both nodes 102 and 104, as well as other nodes. In this embodiment, the applications or components of applications of nodes 102 and 104 operate in a distributed computing environment.

FIG. 1 further shows a data structure 108, such as an object, including information, such as variables, constants, fields, pointers, other objects and the like. In this embodiment of the present invention, the data structure 108 can be any data structure of an object-oriented programming language. In embodiments of the present invention, certain portions of the information in data structure 108 are marshalled by node 102, transmitted through the network 106 and received by node 104, where the information is unmarshalled. This process is described in greater detail below with reference to FIGS. 2-5.

In one embodiment of the present invention, the computer systems of the nodes 102 and 104 are one or more Personal Computers (PCs) (e.g., IBM or compatible PC workstations running the Microsoft Windows operating system, Macintosh computers running the Mac OS operating system, or equivalent), Personal Digital Assistants (PDAs), hand held computers, palm top computers, smart phones, game consoles or any other information processing devices. In another embodiment, the computer systems of the nodes 102 and 104 are a server system (e.g., SUN Ultra workstations running the SunOS operating system or IBM RS/6000 workstations and servers running the AIX operating system). An exemplary computer system for the nodes 102 is 104 is described in greater detail below with reference to FIG. 6.

In one embodiment of the present invention, the network 106 is a circuit switched network, such as the Public Service Telephone Network (PSTN). In another embodiment, the network 106 is a packet switched network. The packet switched network is a wide area network (WAN), such as the global Internet, a private WAN, a local area network (LAN), a telecommunications network or any combination of the above-mentioned networks. In yet another embodiment, the network 106 is a wired network, a wireless network, a broadcast network or a point-to-point network.

Although nodes 102 and 104 are shown as separate entities in FIG. 1, the functions of both nodes may be integrated into one entity. Also, although FIG. 1 shows only two nodes, the present invention supports any number of nodes.

Communicating processes in such multi-node software systems share data and communicate by exchanging messages containing the data. Message-passing processes "marshal" the data, which means gathering the relevant parts of the data from the memory of the sending program and assembling them into a canonical serial format (or wire protocol). This serialized data is then transmitted to the receiver process by writing it to a file or by streaming it over a network, which then "unmarshals" the message into the desired format.

Figure 2:
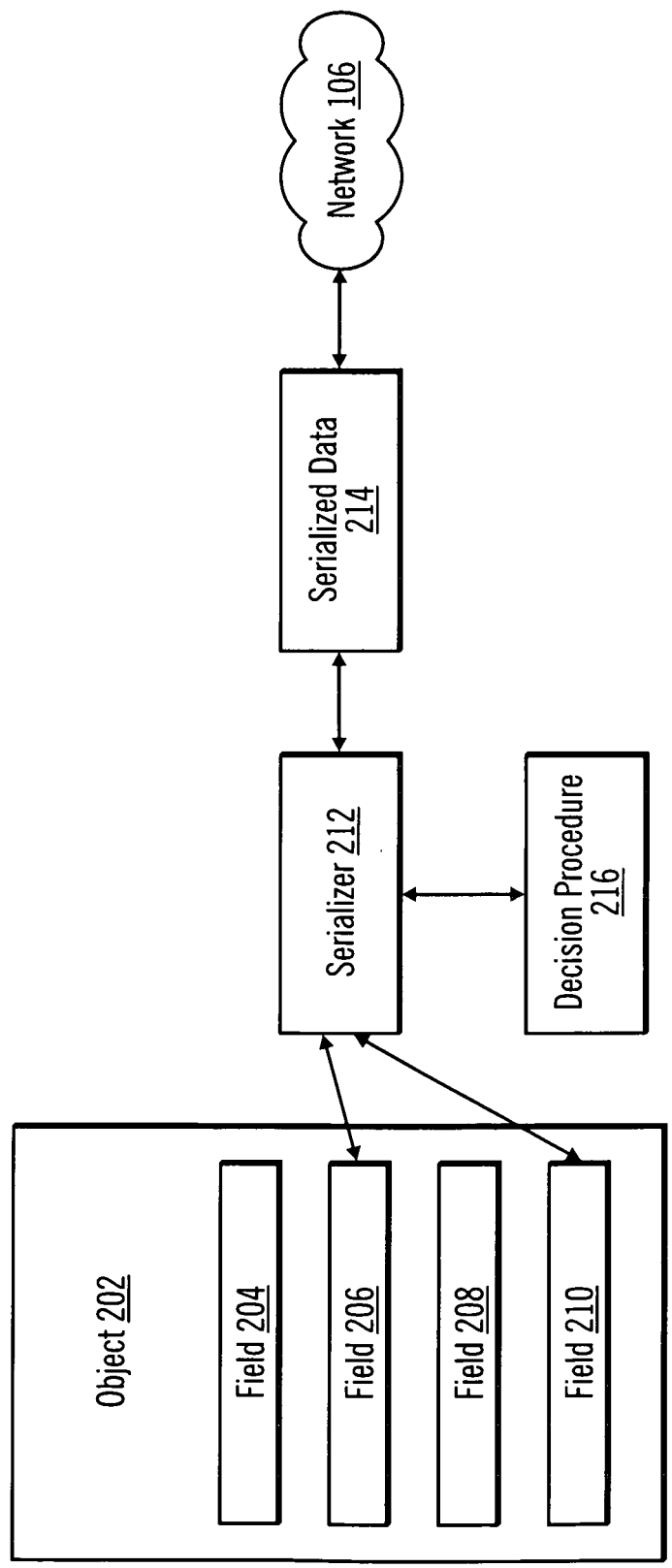
FIG. 2 is a block diagram depicting the marshalling process according to one embodiment of the present invention.

FIG. 2 is a block diagram depicting the marshalling process of one embodiment of the present invention. FIG. 2 shows a data structure, such as object 202, including information such as variables, constants, fields, pointers, other objects and the like. Object 202 includes four data fields: field 204, field 206, field 208 and field 210. The node 102 receives a request to transmit data from the object 202 to the node 104. However, it is not always necessary, to send all fields. If less than all the fields can be sent, bandwidth and system resources can be saved.

For example, consider an electronic "blue book" service which provides fair market value estimates for vehicles. A client application on node 102 sends a message to the server at node 104 which contains the query, requesting the price for a particular vehicle. The server node 104 responds with a message which contains an estimated price.

Both the client and server applications are implemented, for example, in a typed object-oriented programming language, such as C++ or Java. The two applications communicate by exchanging objects of a Message data type. The Message data type holds the following fields.

```
class Message {
Object clientName;
Vehicle v;
}
```

That is, the message datatype represents a structure with 2 fields, one of type Object and one of type Vehicle. (It is assumed that Object is the root of the class hierarchy in the language, where all types are subtypes of Object). The Vehicle type is the root of a type hierarchy describing vehicles. Every Vehicle object has at least 4 fields, representing the vehicle's make, model, year, and vehicle identification number (VIN).

```
class Vehicle {
integer year;
String make;
String model;
String VIN;
};
```

Additionally, the following two subtypes of Vehicle are used.

```
class UsedCar extends Vehicle {
History vehicleHistory;
}
class NewCar extends Vehicle {
Dealer dealer;
}
```

According to this embodiment of the present invention, before marshalling the data and transmitting, the client and server applications agree on a meta-data format to describe the structure of messages. In this embodiment, the agreed meta-data format is based on type descriptions. The type description metadata describes the concrete types (those types that actually arise at runtime) that a Message object contains.

As an example, two cases of this type meta-data are considered.

Type T1: {clientName->String; v->UsedCar}
Type T2: {clientName->String; v->NewCar}

Type T1 describes a Message object where the client-Name field has type String, and the v field has type UsedCar. Type T2 is similar, but describes an object referring to a Vehicle of type NewCar.

When the client program is ready to send a query to the server, it first summarizes the type description of the Message describing the query. If the Message refers to a UsedCar, it sends a message "T1" to the server. If the Message refers to a NewCar, it sends the message "T2" to the server. The server then receives the meta-data sent by the client.

As an illustrative example, suppose that the program executing on the server proceeds as follows. For queries regarding a used car, the server computes a price based solely on the vehicle's VIN. The program consults a database of used car information indexed by VIN, and does not require additional information from the client. However, the database does not contain information on new cars. Instead, the program computes the price of a new car based on the make, model, and year.

Based on this, the server computes a meta-data abstraction describing the required information based on the type description of the message. The meta-data information, in this case, consists of the names of fields that hold information that might be relevant for this query, as shown by the following.

```
If (type == T1) {
requiredFields = v, VIN
} else if (type == T2) {
required Fields = v, make, model, year
}
```

The server then sends the "required fields" meta-data to the client.

After receiving the "required fields" meta-data, the client marshals the Message data based on the required field meta-data. Referring still to FIG. 2, the serializer 212, representing the serialization process executed on the client node 102, consults the decision procedure 216 of the client node 102, in order to identify certain portions of the object 202 for marshalling and transmission. The decision procedure decides that fields 206 and 210 shall be marshalled for transmission to the server node 104. Accordingly, fields 204 and 208 will not be marshalled for transmission to node 104. Subsequently, the serializer 212 marshals the fields 206 and 210 and produces the serialized data 214, which is then transmitted to the node 104 via the network 106.

So, in the new car query example, the client marshals a Message in which the clientName field is omitted (since the server did not indicate that clientName is a required field), and the v field refers to a Vehicle object which contains only the year, make, and model fields. The original VIN and dealer fields are omitted, since the server did not indicate they were required. The marshalling is similar for a used-car, but includes only the VIN field in the Vehicle object.

The client then sends the message to the server, who receives it and processes the query.

Figure 3:
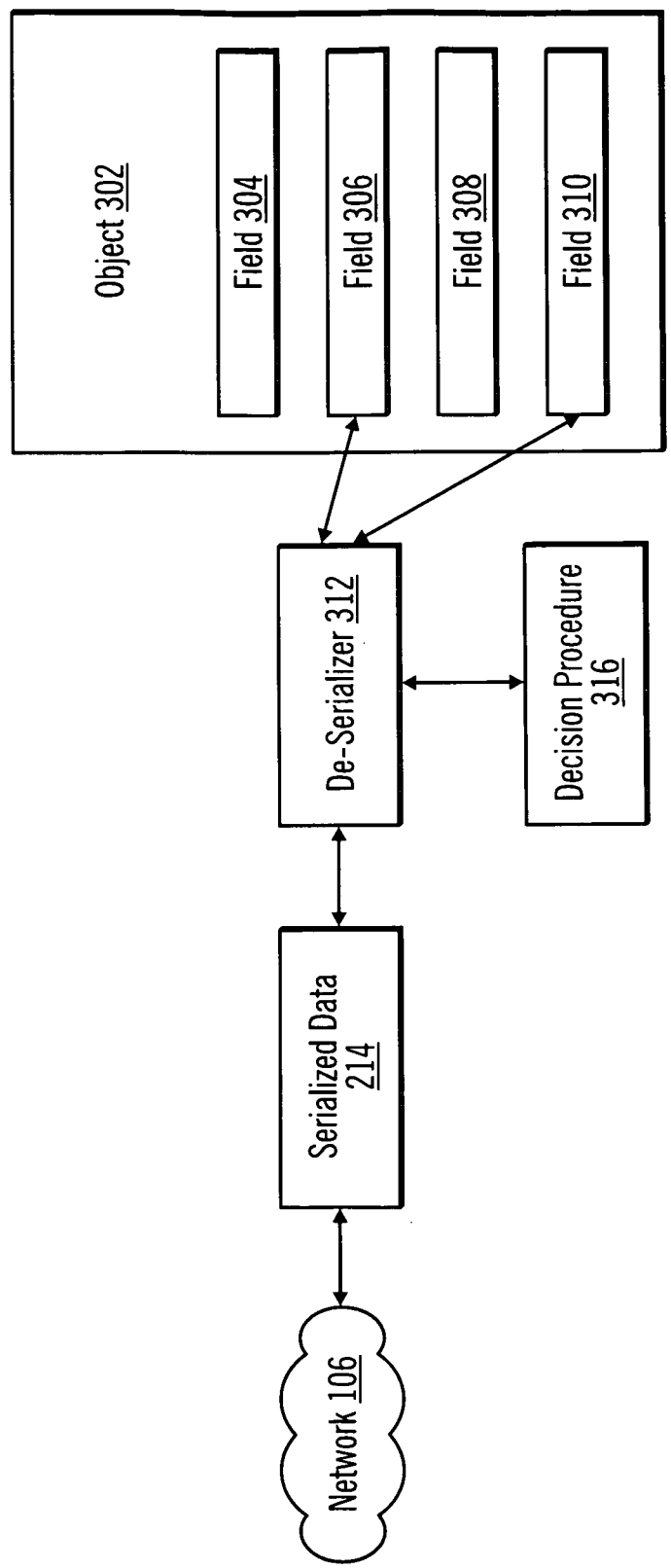
FIG. 3 is a block diagram depicting the unmarshalling process according to one embodiment of the present invention.

FIG. 3 is a block diagram depicting the unmarshalling process of one embodiment of the present invention. FIG. 3 shows that the serialized data 214 is received by the server node 104 from the client node 102 via the network 106.

FIG. 3 shows a data structure, such as object 302, including information such as that described for object 202 in FIG. 2. Object 302 includes four data fields: field 304, field 306, field 308 and field 310. The server node 104 receives a request to receive data for the object 302. The de-serializer 312, representing the de-serialization process executed on the server node 104, consults the decision procedure 316 in order to identify certain portions of the serialized data 214 for unmarshalling into object 302. The decision procedure 316 reads meta-data embedded in the serialized message that describes the contents of the serialized data structure. The decision procedure decides that fields 306 and 310 shall be unmarshalled from the serialized data 214. Information for fields 304 and 308 shall not be unmarshalled from the serialized data 214. Subsequently, the de-serializer 312 unmarshals data from the serialized data 214 into fields 506 and 310.

Figure 4:
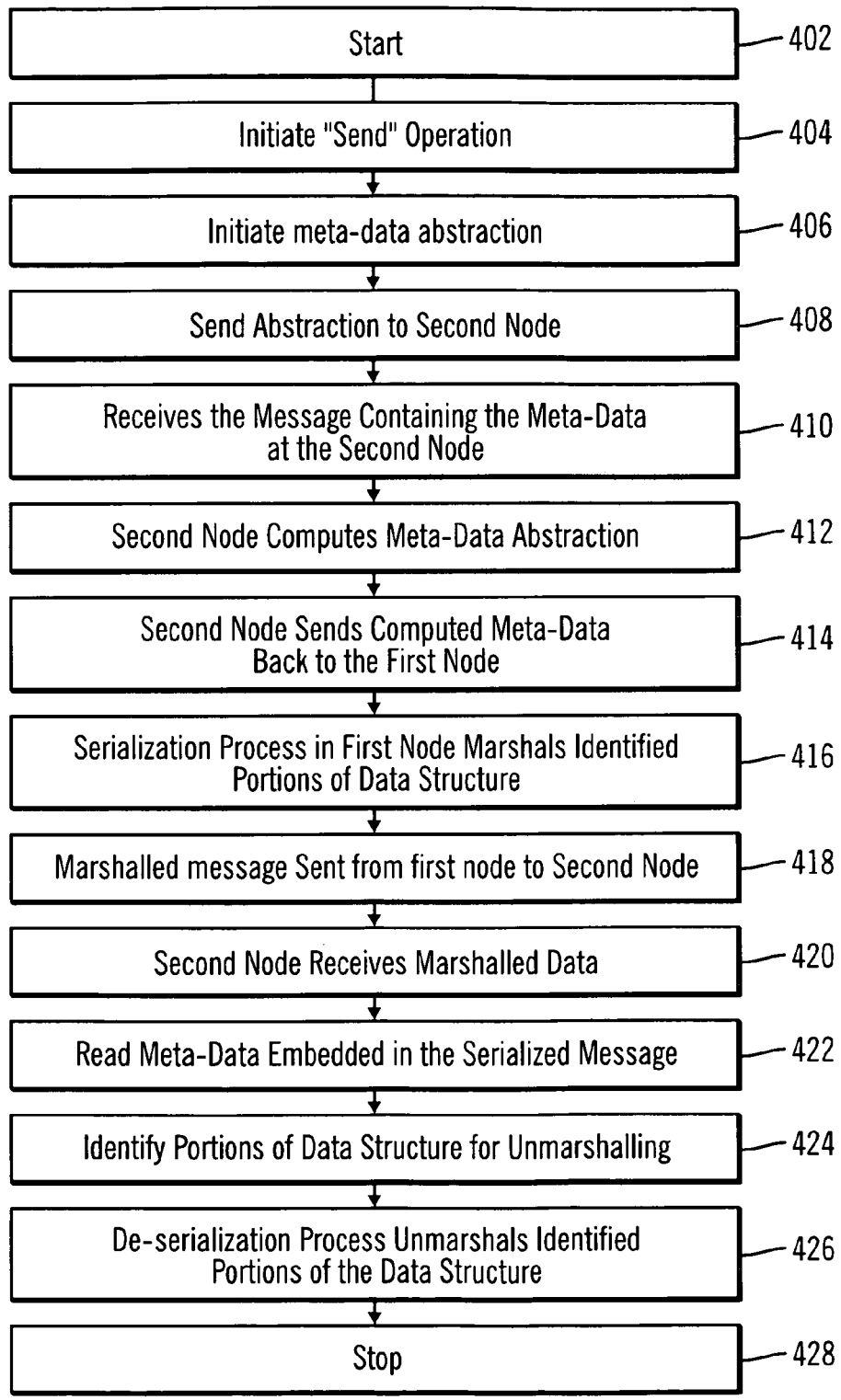
FIG. 4 is a flow chart depicting the control flow of the marshalling and unmarshalling processes according to one embodiment of the present invention.

FIG. 4 is a flow chart depicting the control flow of the marshalling and unmarshalling processes of one embodiment of the present invention. FIG. 4 shows the sequence of events that occur when an application or component of an application marshals data for transmission to a second node 104. The control flow of FIG. 4 begins with step 402 and flows directly to step 404. In step 404, a send operation is initiated at node 102, for example, in an attempt to send required data, from a data structure 108, to node 104. This action spawns the initiation, in step 406, of a meta-data abstraction describing the data structure(s) that describe the body of the message being sent to the second node 104. The abstraction is sent to the second node in step 408. In step 410 the second node receives the message containing the meta-data. The second node 104 computes, in step 412, a meta-data abstraction describing the portion(s) of the data structure that it requires in order to service the request. In step 414, the second node 104 sends the computed meta-data back to the first node 102.

In step 416, based on the portions of the data structure 108 that were identified in step 412 above, the serialization process in the first node 102 marshals the portions of the data structure 108 that were identified. The marshalled message is then sent from the first node 102 to the second node 104 in step 418. In step 420, the second node 104 receives the marshalled data. In step 422, a decision procedure begins by reading meta-data embedded in the serialized message that describes the contents of the serialized data structure. In step 424, based on the data that was read in step 422 above, portions of the data structure 108 are identified for unmarshalling. Finally, in step 426, based on the portions of the data structure 108 that were identified in step 424 above, the de-serialization process unmarshals the portions of the data structure 108 that were identified.

Figure 5:
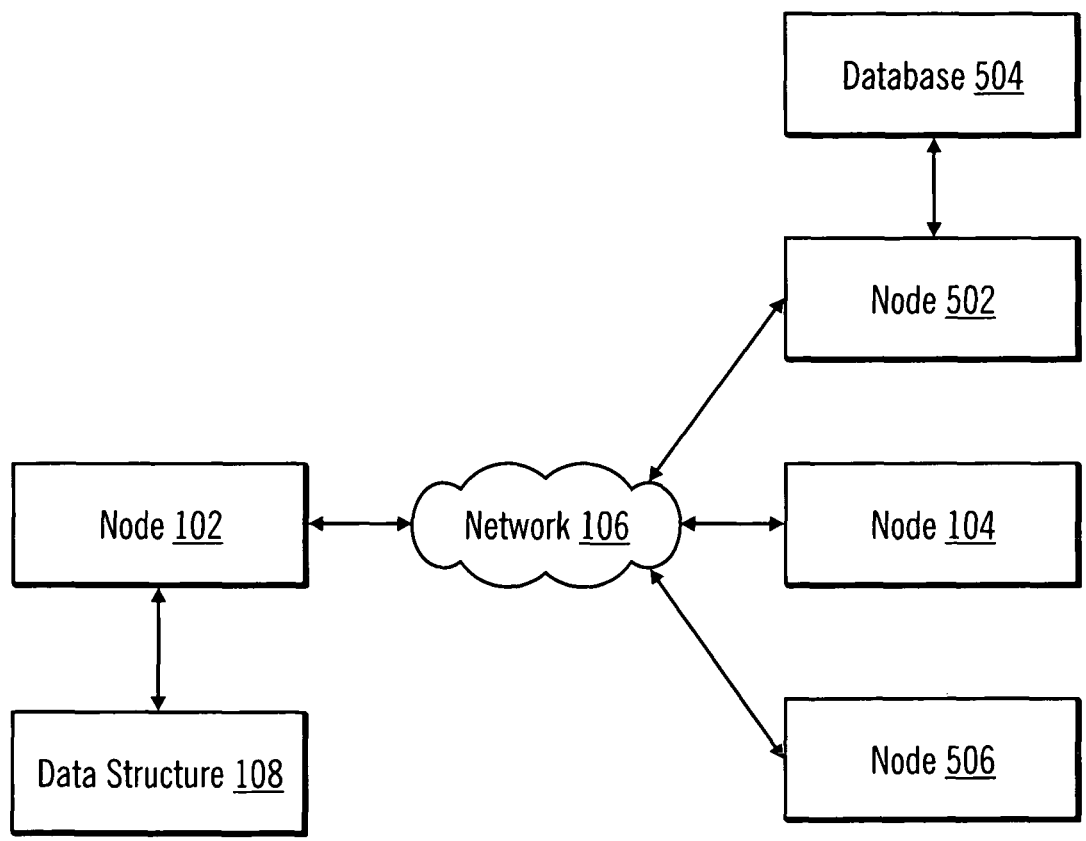
FIG. 5 is a block diagram showing a high-level network architecture having several server nodes according to another embodiment of the present invention.

In another embodiment of the present invention, as shown in FIG. 5, more than one server node is provided. For instance, suppose the client 102 wishes to use a second server node 502 for this operation, which conforms to the same interface as described above. Suppose further that this second server implementation relies on a database 504 which holds both new and old cars indexed by VIN. In this embodiment, the second server node 502 would indicate to the client 102 that only the VIN number was required. In particular, the meta-data information in this case would consist of the names of fields that hold this information (i.e., requiredFields=v, VIN). In yet another embodiment, a third server node 506 might have no access to any database, but instead relies on the client 102 to provide the vehicle history for used cars. Here again, the meta-data information would consist of the names of fields that hold that information (i.e., requiredFields=v, vehicleHistory).

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following: a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 6:
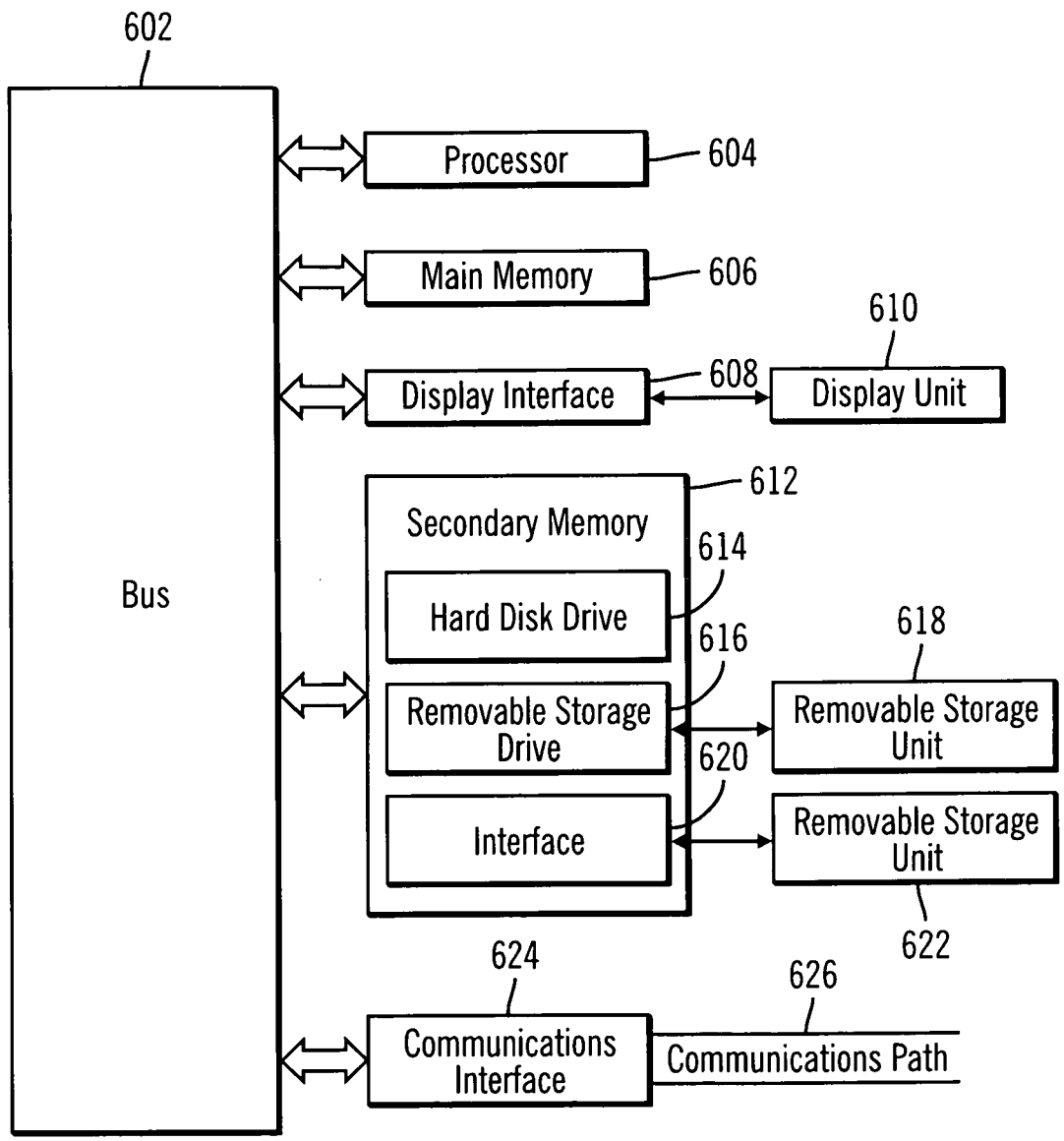
FIG. 6 is a high level block diagram showing an information processing system useful for implementing embodiments of the present invention.

FIG. 6 is a high level block diagram showing an exemplary information processing system useful for implementing embodiments of the present invention. The computer system includes one or more processors, such as processor 604. The processor 604 is connected to a communication infrastructure 602 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 608 that forwards graphics, text, and other data from the communication infrastructure 602 (or from a frame buffer not shown) for display on the display unit 610. The computer system also includes a main memory 606, preferably random access memory (RAM), and may also include a secondary memory 612. The secondary memory 612 may include, for example, a hard disk drive 614 and/or a removable storage drive 616, representing a floppy disk drive, a magnetic tape drive, an optical disk drive, etc. The removable storage drive 616 reads from and/or writes to a removable storage unit 618 in a manner well known to those having ordinary skill in the art. Removable storage unit 618, represents a floppy disk, a compact disc, magnetic tape, optical disk, etc. which is read by and written to by removable storage drive 616. As will be appreciated, the removable storage unit 618 includes a computer readable medium having stored therein computer software and/or data.

In alternative embodiments, the secondary memory 612 may include other similar means for allowing computer programs or other instructions to be loaded into the computer system. Such means may include, for example, a removable storage unit 622 and an interface 620. Examples of such may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to the computer system.

The computer system may also include a communications interface 624. Communications interface 624 allows software and data to be transferred between the computer system and external devices. Examples of communications interface 624 may include a modem, a network interface (such as an Ethernet card), a communications port, a PCM- CIA slot and card, etc. Software and data transferred via communications interface 624 are in the form of signals which may be, for example, electronic, electromagnetic, optical, or other signals capable of being received by communications interface 624. These signals are provided to communications interface 624 via a communications path (i.e., channel) 626. This channel 626 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 606 and secondary memory 612, removable storage drive 616, a hard disk installed in hard disk drive 614, and signals. These computer program products are means for providing software to the computer system. The computer readable medium allows the computer system to read data, instructions, messages or message packets, and other computer readable information from the computer readable medium.

Computer programs (also called computer control logic) are stored in main memory 606 and/or secondary memory 612. Computer programs may also be received via communications interface 624. Such computer programs, when executed, enable the computer system to perform the features of the present invention as discussed herein. In particular, the computer programs, when executed, enable the processor 604 to perform the features of the computer system. Accordingly, such computer programs represent controllers of the computer system.

What has been shown and discussed is a highly-simplified depiction of a programmable computer apparatus. Those skilled in the art will appreciate that other low-level components and connections are required in any practical application of a computer apparatus.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A computer implemented method for communicating information between first and second nodes, the method comprising:

receiving, at the second node, a request from the first node, wherein the request allows the first node and the second node to agree upon a meta-data format and describes a structure of at least a second message to be sent from the first node to the second node, wherein the second message comprises at least one query to be serviced by the second node, and wherein the request comprising a first message from the first node, the first message comprising a first metadata abstraction identifying a set of data fields and a type of each of the set of data fields for a data structure that comprises a body of the second message to be sent from the first node to the second node, wherein the first metadata abstraction is absent a value for each of the set of data fields;

after receiving the first message comprising the first metadata abstraction, identifying, by the second node, a subset of the data fields of the data structure required by the second node to satisfy the query within the second message to be sent from the first node, the subset of the data fields of the data structure being identified from the first message;

after identifying the subset of the data fields of the data structure, sending a second metadata abstraction from the second node to the first node, the second metadata abstraction comprising the subset of the data fields of the data structure that have been identified, wherein the second metadata abstraction is absent a value for each of the subset of data fields;

after sending the second metadata abstraction from the second node to the first node, receiving, at the second node, the second message from the first node, wherein the second message comprising a marshalled subset of the data structure, the marshalled subset of the data structure containing only the subset of the data fields of the data structure that were identified by the second metadata abstraction as being required by the second node, wherein the second message also comprising metadata that describes the contents of the marshalled subset of the data structure;

after receiving the second message, reading, at the second node, the metadata from the second message that describes the contents of the marshalled subset of the data structure;

after reading the metadata from the second message, deciding a portion of the metadata of the second message to unmarshal;

unmarshalling, at the second node based on the portion of metadata from the second message, the marshalled subset of the data structure from the second message that contains only the subset of the data fields of the data structure that were identified by the second metadata abstraction as being required by the second node; and after unmarshalling the marshalled subset of the data structure, satisfying the query by sending requested data from the second node to the first node based on the marshalled subset of the data structure.

2. The method of claim 1, wherein the data structure includes an object.

3. The method of claim 1, wherein the marshalled subset of the data structure comprises a serialized subset of the data structure that includes each of the data fields in the data structure that was identified by the second metadata abstraction but does not include any of the data fields in the structure that were not identified by the second metadata abstraction.

4. The method of claim 1, further comprising determining, at the second node based on the first metadata abstraction, whether the one data field of the data structure has a first type or a second type with respect to the query.

5. The method of claim 4, wherein the data structure comprises vehicle data, the first type of the one data field indicates that the query refers to a used car, and the second type of the one data field indicates the query refers to a new car.

6. The method of claim 5, wherein the requested data comprises a vehicle price.

7. The method of claim 1, wherein the second metadata abstraction consists of names of the data fields of the data structure that contain information required by the second node to satisfy the query.

8. The method of claim 1, further comprising:
before receiving the first message, providing a metadata format for the first metadata abstraction, the metadata format describing the structure of messages.

9. The method of claim 8, wherein the metadata format is based on type descriptions that describe concrete types of data fields that messages contain.

10. The method of claim 1, wherein the first metadata abstraction indicates a type of one of the data fields of the data structure with respect to the query.

11. The method of claim 10, wherein the first message does not include the query, and the second message includes the query.

12. The method of claim 1, wherein at least one of the first message and the second message comprises the query.

13. The method of claim 1, wherein the second message also comprises the query.

14. The method of claim 1, wherein the first message does not include the query, and the second message includes the query.

15. An information processing system comprising:
an interface adapted to receive messages from other nodes; and
a processor;
wherein the interface receives a request from at least one other node, wherein the request allows the interface of the information processing system and the other node to agree upon a metadata format and describes a structure of at least a second message to be sent from the other node to the information processing system, wherein the second message comprises at least one query to be serviced by the information processing system, and wherein the request comprising a first message from at least one other node, the first message comprising a first metadata abstraction identifying a set of data fields and a type of each of the set of data fields for a data structure that comprises a body of the second message to be sent from the information processing system to the other node, wherein the first metadata abstraction is absent a value for each of the set of data fields,
the interface, after receiving the first message comprising the first metadata abstraction,
after identifying the subset of the data fields of the data structure, send a second metadata abstraction from the information processing system to the other node, the second metadata abstraction identifying which of the data fields of the data structure are required by the information processing system to satisfy a query based on the first metadata abstraction that was received, wherein the second metadata abstraction is absent a value for each of the subset of data fields,
the interface, after sending the second metadata abstraction to the other node, receives the second message from the other node, the second message comprising a marshalled subset of the data structure, the marshalled subset of the data structure containing only the subset of the data fields of the data structure that were identified by second metadata abstraction as being required by the information processing system, wherein the second message also comprising metadata that describes the contents of the marshalled subset of the data structure,
the processor, after the second message is received, reads the metadata from the second message that describes the contents of the marshalled subset of the data structure,
the processor after reading the metadata from the second message, decides a portion of the metadata of the second message to unmarshal,
unmarshal, based on the portion of the metadata from the second message, the marshalled subset of the data structure from the second message that contains only the subset of the data fields of the data structure that were identified by the second metadata abstraction as being required by the information processing system, wherein the marshalled subset of the data structure is unmarshalled into a format desired by the information processing system, and
the interface after the marshalled subset of the data structure is unmarshalled, satisfies the query by sending requested data to the other node based on the marshalled subset of the data structure.

16. The information processing system of claim 15, wherein the marshalled subset of the data structure comprises a serialized subset of the data structure that includes each of the data fields in the data structure that was identified by the second metadata abstraction but does not include any of the data fields in the data structure that were not identified by the second metadata abstraction.

17. The information processing system of claim 15, wherein the second metadata abstraction consists of names of the data fields of the data structure that contain information required by the information processing system to satisfy the query.

18. A computer implemented method for communicating information between first and second nodes, the method comprising:
sending a request from the first node to the second node, wherein the request allows the first node and the second node to agree upon a metadata format and describes a structure of at least a second message to be sent from the first node to the second node, wherein the second message comprises at least one query to be serviced by the second node, the request comprising a first message from the first node to the second node, wherein the first message comprising a first metadata abstraction identifying a set of data fields and a type of each of the set of data fields for a data structure that comprises a body of the second message to be sent from the first node to the second node, wherein the first metadata abstraction is absent a value for each of the set of data fields;
after sending the first message comprising the first metadata abstraction, receiving, at the first node, a second metadata abstraction from the second node, the second metadata abstraction having been generated based on the first metadata abstraction and identifying which of the data subset of the fields of the data structure are required by the second node to satisfy the query within the second message to be sent from the first node to the second node, where the second metadata abstraction is absent a value for each of the subset of data fields;
after receiving the second metadata abstraction from the second node, marshalling, at the first node, a subset of the data structure based on the second metadata abstraction, wherein the subset of the data structure containing only the subset of the data fields of the data structure that were identified by the second metadata abstraction as being required by the second node;

after marshalling the subset of the data structure based on the second metadata abstraction, sending the second message from the first node to the second node, wherein the second message comprising the subset of the data fields of data structure that was marshalled, wherein the second message also comprising metadata that describes the contents of the subset of the data fields of data structure that was marshalled; and after sending the second message comprising the subset of the data structure that was marshalled and the metadata, deciding a portion of the metadata of the second message to unmarshal, unmarshal, based on the portion of the metadata from the second message, and having the query satisfied by receiving, at the first node, requested data from the second node based on the second message that was sent to the second node.

19. The method of claim 18, wherein the first metadata abstraction indicates a type of one of the data fields of the data structure with respect to the query.

20. The method of claim 19, wherein the first message does not include the query, and the second message includes the query.

* * * * *